United States Patent [19]

Yoshino

[11] 4,406,854
[45] Sep. 27, 1983

[54] METHOD OF MOLDING A BOTTLE-SHAPED CONTAINER OF SYNTHETIC RESIN

[75] Inventor: Yataro Yoshino, Tokyo, Japan

[73] Assignee: Yoshino Kogyosho Co. Ltd., Tokyo, Japan

[21] Appl. No.: 306,674

[22] Filed: Sep. 29, 1981

Related U.S. Application Data

[62] Division of Ser. No. 100,912, Dec. 6, 1979, abandoned.

[30] Foreign Application Priority Data

Dec. 13, 1978 [JP] Japan ................................. 53/154345

[51] Int. Cl.³ ............................................. B29C 17/07
[52] U.S. Cl. .................................. 264/532; 215/1 C; 425/529; 428/35
[58] Field of Search .......................... 215/1 C; 428/35; 264/532, 537, 535; 425/529

[56] References Cited

U.S. PATENT DOCUMENTS

| | | | |
|---|---|---|---|
| 3,137,748 | 6/1964 | Makowski | 215/1 C X |
| 3,412,188 | 11/1968 | Seefluth | 264/532 X |
| 3,923,943 | 12/1975 | Iriko et al. | 264/532 |
| 3,934,743 | 1/1976 | McChesney et al. | 215/1 C |
| 3,972,976 | 8/1976 | Farrell | 264/532 X |
| 4,174,043 | 11/1979 | Salame et al. | 215/1 C |

FOREIGN PATENT DOCUMENTS

882497  6/1943  France ................................. 264/537

*Primary Examiner*—Jan H. Silbaugh
*Attorney, Agent, or Firm*—Parkhurst & Oliff

[57] ABSTRACT

A tubular parison for molding a bottle-shaped container of biaxially oriented synthetic resin and a bottle-shaped container blow-molded from the tubular parison for filling, for example, drinking water containing carbon dioxide gas or the like. The tubular parison is advantageously formed so that the shoulder and bottom forming portions are thinner by a predetermined ratio than the body thereof. Thus, the bottle-shaped container blow-molded from the tubular parison is much stronger in construction.

4 Claims, 4 Drawing Figures

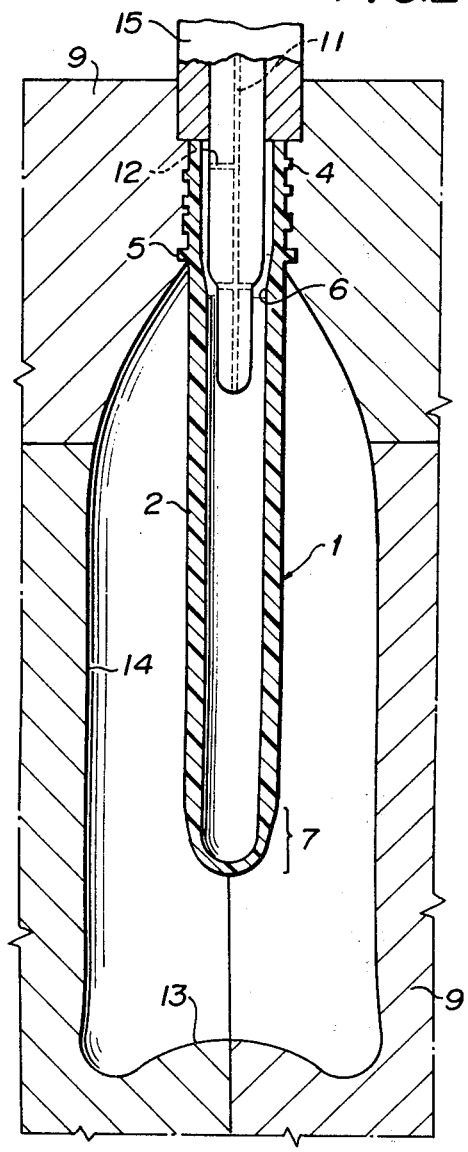
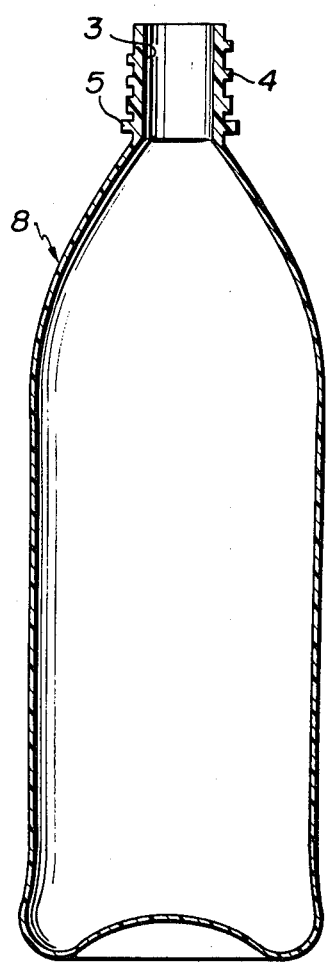

METHOD OF MOLDING A BOTTLE-SHAPED CONTAINER OF SYNTHETIC RESIN

This is a Division of application Ser. No. 100,912 filed Dec. 6, 1979 and now abandoned.

BACKGROUND OF THE INVENTION

This invention relates to a bottle-shaped container of synthetic resin and, more particularly, to a tubular parison for molding a bottle-shaped container of biaxially oriented synthetic resin and a bottle-shaped container blow-molded from the tubular parison for adaptively filling, for example, drinking water containing carbon dioxide gas or cooling beverage containing no carbon dioxide gas.

Glass bottles are heretofore employed for filling drinking water containing carbon dioxide gas or cooling beverage containing no carbon dioxide gas. Such glass bottles are heavy and expensive to handle and generally inconvenient. For the purpose of eliminating these disadvantages, light synthetic resin is used as the material of the bottles to enhance the mechanical strength the bottles of synthetic resin by means of biaxial orientation. However, the bottles formed often have incomplete biaxial orientation at the bottom center and shoulder thereof and further have thinner walls at the integral part between the peripheral edge of the bottom wall thereof and the lower end of the body thereof than the other portions to thereby cause the strength of the portions to be weakened.

SUMMARY OF THE INVENTION

It is, therefore, a primary object of this invention to provide a tubular parison for molding a bottle-shaped container of biaxially oriented synthetic resin which can easily be molded by biaxial orientation without aforementioned disadvantages of the conventional bottles of synthetic resin.

It is another object of this invention to provide a tubular parison for molding a bottle-shaped container of biaxially oriented synthetic resin which can approach the orientation magnitude at the shoulder and bottom portions to that of the body of finally biaxially oriented bottle-shaped container to the same degree.

It is a further object of this invention to provide a bottle-shaped container of biaxially oriented synthetic resin blow molded from a tubular parison which is much stronger than the conventional bottle due to advantageous biaxial orientation at the shoulder and bottom portions thereof.

It is still another object of this invention to provide a tubular parison for molding a bottle-shaped container of biaxially oriented synthetic resin which is much simpler in construction thereof and less expensive than the conventional bottle.

BRIEF DESCRIPTION OF THE DRAWINGS

The above and other related objects and features of the invention will be apparent from a reading of the following description of the disclosure found in the accompanying drawings and the novelty thereof pointed out in the appended claims.

FIG. 2 is a longitudinal sectional view of the tubular parison set in a mold for biaxially orientation blow molding the same;

FIG. 4 is a longitudinal sectional view of bottle-shaped container blow-molded from the parison.

DETAILED DESCRIPTION OF THE PREFERRED EMBODIMENTS

Figure 1:
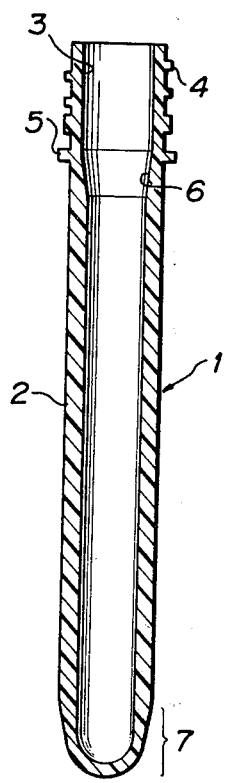
FIG. 1 is a longitudinal sectional view of a tubular parison constructed according to this invention.

Referring to the drawings, particularly to FIG. 1 showing one preferred embodiment of a tubular parison constructed according to the present invention for molding a bottle-shaped container of biaxially oriented synthetic resin, wherein like reference numerals designate the same parts in the following views, reference numeral 1 generally designates a tubular parison with a bottom and an upper opening for molding a bottle-shaped container of biaxially oriented synthetic resin. The synthetic resin includes, for example, preferably saturated polyester resin, or polypropylene, vinyl chloride, etc. adapted for a biaxial orientation. This tubular parison 1 is formed by an injection molding process.

The body 2 of the tubular parison 1 is formed in cylindrical shape preferably. The parison 1 is formed with an upper port forming portion 3 at the top thereof and with threads 4 prefinished on the outer periphery of the upper port forming portion 3 thereof for engaging in mesh with a cap (not shown). The parison 1 is further formed with a flange 5 directed outwardly for engaging the lower end of the peripheral wall of the cap (not shown). The upper portion forming portion 3 is formed above the flange 5 at the parison 1, and is so formed as to be capable of becoming the neck portion as it is of a finally blow-molded bottle-shaped container.

The tubular parison 1 of this invention is advantageously so formed that the shoulder forming portion 6 located between the upper port forming portion 3 and the body 2 thereof and a bottom forming portion 7 are approx. 80% thick or less as compared with the body 2.

Figure 3:
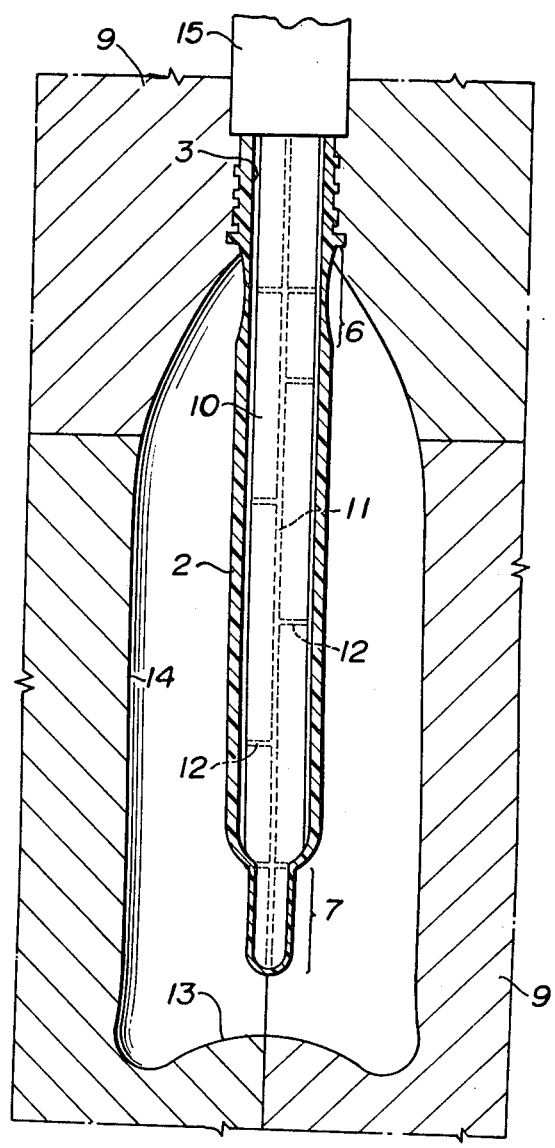
FIG. 3 is a view similar to FIG. 2 but showing the state that the tubular parison is axially oriented in the mold.

A bottle-shaped container 8 of biaxially oriented synthetic resin as shown in FIG. 4 is blow-molded from the tubular parison 1 by the steps of heating the tubular parison 1 to a temperature above the glass transition temperature and below the crystallization temperature setting it in a blow-molding mold 9 (FIG. 2), clamping the port forming portion 3 of the parison 1 in the mold 9 to elevationally movably insert a push rod 10 slidably supported by a bushing 15 into the interior of the tubular parison 1 as shown in FIG. 2, and then pushing down the push rod 10 to axially orient the parison 1 as shown in FIG. 3. The tubular parison 1 is mainly oriented at the thinner portions such as at the shoulder and bottom forming portions 6 and 7 to thus reduce further the thicknesses of both the shoulder and bottom forming portions 6 and 7, respectively as shown in FIG. 3. When the tubular parison 1 is further oriented to the bottom 13 of the cavity in the mold 9 while blowing high pressure air through blowing passages 11 and blowing inlet 12 perforated at the push rod 10 from the above state, it is urged at the shoulder and bottom forming portions 6 and 7 initially reduced in thickness toward the wall surface 14 of the cavity in the mold 9 and is then biaxially oriented at the body 2 toward the inner wall of the cavity in the mold 9 so as to thereby blow-mold a bottle-shaped container 8.

It is noted that the thickness ratio of the shoulder and bottom forming portions 6 and 7 to the body 2 depends advantageously upon the shape of a finally blow-molded bottle-shaped container and orientation magnitude as desired for the bottle-shaped container but may preferably be determined to perform a desired bottle-shaped container by axially orienting the tubular parison 1 prior to the biaxial orientation of the body of the parison 1 to essentially eliminate the insufficiently biaxial orientation at the shoulder and bottom forming portions of the tubular parison 1. If the thickness ratio is excessively low, the tubular parison is simultaneously oriented at the body thereof upon axial orientation thereof at the shoulder and bottom forming portions resulting in insufficient effect.

It should be understood from the foregoing description that since the tubular parison thus constructed according to this invention is approx. 80% or less thick at the shoulder and bottom forming portions thereof than the body thereof, it is easy to cause the orientation magnitude at the shoulder and bottom forming portions of the tubular parison to approach that of the body of the parison to the same degree by axially orienting initially the tubular parison and then biaxially orienting it. It should also be appreciated that since the tubular parison thus constructed according to this invention is exactly biaxially oriented at the shoulder and bottom forming portions to blow-mold a bottle-shaped container, the bottle-shaped container thus blow-molded is quite strong in construction. It should also be understood that since the tubular parison is constructed far more simply, the finally blow-molded bottle-shaped container is less expensive.

What is claimed is:

1. A process for forming a bottle-shaped container, comprising:

heating a parison of biaxially orientable resin to a temperature for biaxial orientation blow molding; then longitudinally stretching and axially orienting the parison in a blowing mold, said parison comprising, in unstretched condition:

an upper port forming portion;

a body of substantially uniform thickness;

a shoulder forming portion located between the upper port forming portion and the body; and a bottom forming portion, wherein the shoulder and bottom portions each have a thickness which is about 80% or less than that of said body, said shoulder forming and bottom forming portions being reduced further in thickness and being the portions of the parison mainly oriented by said longitudinal stretching; and then blowing said longitudinally stretched parison to a bottle shape to biaxially orient the resin of the body;

the shoulder forming and bottom forming portions undergoing an amount of orientation which approaches that undergone by the body.

2. A process as claimed in claim 1, wherein said longitudinal stretching is performed by a slidable push rod located in the interior of said parison.

3. A method as claimed in claim 2, wherein said push rod is hollow and perforated to provide air for said blowing.

4. A method as claimed in any one of claims 1 through 3 wherein said parison body is substantially cylindrical.

* * * * *